United States Patent Office 3,575,714
Patented Apr. 20, 1971

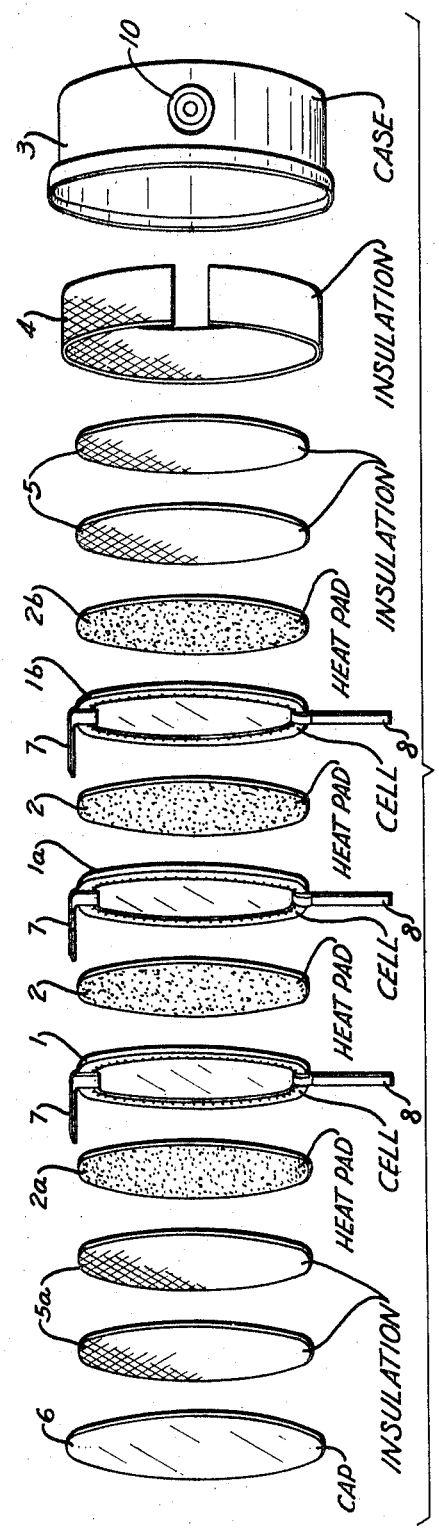
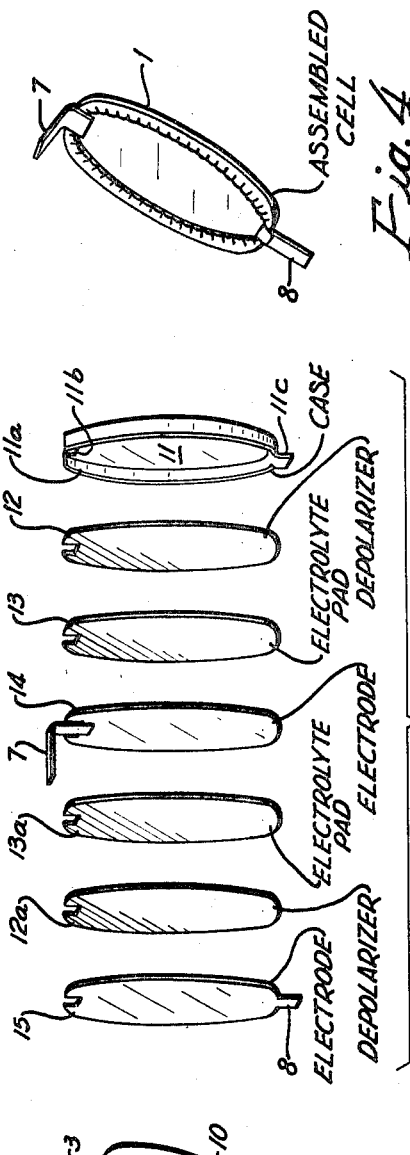
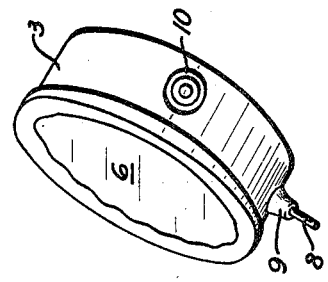
INVENTORS
OWEN G. BENNETT
JOHN P. WOOLLEY
BY
THEIR ATTORNEYS

3,575,714
THERMAL TYPE PRIMARY CELL
Owen G. Bennett, Brooklandville, and John P. Woolley, Ruxton, Md., assignors to Catalyst Research Corporation, Baltimore, Md.
Filed Aug. 7, 1953, Ser. No. 372,872
Int. Cl. H01m 21/14
U.S. Cl. 136—83                                    5 Claims This invention relates to thermal type deferred action primary cells and batteries.

With reference to primary sources of electric current, the word "cell" usually applies to a single element comprising a pair of electrodes and an electrolyte that coact to produce electric current. Likewise, the word "battery" is generally taken to contemplate an assembly of two or more such cells. However, for convenience and brevity of reference the word "cell" is used herein as applying to and contemplating both meanings.

Conventional types of primary cells embody electrolytes that are liquid at normal temperatures; commonly they are aqueous solutions of inorganic salts, acids, or bases. Such electrolytes may be present in free liquid form (wet cells), or they may be absorbed by a carrier material (dry cells). Such cells are operative as soon as they are assembled, and it is characteristic of them that their effectiveness decreases progressively at subnormal temperatures, whereby their low temperature capacity is poor. Likewise, such normally liquid electrolytes may freeze with depreciation in or destruction of cell functioning. On the other hand, their upper functional limit is fixed by the boiling point of the solvent, which is commonly water, or by decomposition of active material. Additionally, wet cells are highly fragile, and cannot be used where there is danger of shock, nor under conditions that may cause the electrolyte to be spilled. It is characteristic of dry cells that even if not put in use they undergo progressive deterioration to a point where they will no longer function.

In contradistinction, the present invention is concerned with primary cells of the thermal type, i.e., cells that are inactive at normal atmospheric temperatures and which become activated only upon heat being supplied to the unit. Such cells include at least one positive plate and one negative plate and an electrolyte that is solid and inactive at ordinary atmospheric temperatures but which becomes functionally active only when heat is supplied, usually but not necessarily in an amount sufficient to melt, or fuse, the electrolyte. Such cells remain active only while the electrolyte is hot. Preferably the electrolyte is mounted by an electrolyte carrier.

For some purposes there has existed a need for thermal cells, as that term is used herein, that can be made extremely compact and of small size, that are very light in weight, that may be rendered functionally active without an external heat source, that possess shelf life of the order of years, that function rapidly when desired and irrespective of exposure at that time to extremely low temperatures, that yield good energy output per unit of volume and weight, the performance of which is independent of ambient temperature, and that are not affected by vibration or by shock or similarly acting forces such, for example, as linear or rotational acceleration up to several thousand times the force of gravity (G).

Primary cells operating with fused electrolytes have been proposed heretofore. As far as we know, however, they have never attained commercial adoption, nor have they been adapted to the foregoing and related purposes as described briefly in the preceding paragraph. Thus, the previously proposed thermal cells have required an external heat source, they have been very bulky and heavy, and they have been of quite complex construction. In no sense have the previously proposed thermal cells been adapted to meet or fulfill the requirements just stated.

An object of the invention is to provide thermal cells comprising a sealed case enclosing electrodes and an associated electrolyte that is inactive at normal temperatures but which becomes active when heat is supplied to it, and which are of light weight and compact.

A special object is to provide thermal cells in which the electrolyte is mounted on or impregnated into a continuously solid electrolyte carrier.

It is among the objects of this invention to provide wholly enclosed thermal cells comprising electrodes, a normally inactive electrolyte, preferably impregnated into a carrier that is non-fusible in use, and self-contained means for supplying heat by chemical action, without the generation of any substantial amount of gas, to render the cells functionally active at the desired time.

Another object is to provide thermal cells in accordance with the foregoing object and which may be activated slowly or rapidly within an extremely brief interval, of the order of a fraction of a second, when desired, even when the cell is itself exposed to low ambient temperatures such as may be encountered in arctic or high altitude regions.

A special object is to provide thermal cells according to either or both of the foregoing objects in which the heat necessary to cause the cell to function is generated within the electrolyte body itself.

Still another object is to provide thermal cells in accordance with any or all of the foregoing objects that possess, singly or in combination, simplicity, compactness and ruggedness of construction, that are of extremely small size and of very light weight relative to other types of primary cells, whether of the liquid electrolyte or of the previously proposed thermal cell types, that possess shelf life of the order of many years under widely varying storage conditions, and that are capable of withstanding shock and forces due to high acceleration, even of the order of several thousand G.

Yet another object is to provide thermal cells in accordance with any or all of the foregoing objects that comprise multiple electrode pairs to supply desired power within the capabilities of primary cell combinations.

A still further object is to provide thermal cells in accordance with any or all of the foregoing objects that operate, when called upon, for a desired interval of time, for example, of the order of a second or up to fifteen or more minutes, yet sufficient to accomplish a desired purpose such, for example, as to actuate another device.

Another object is to provide thermal cells in accordance with any of the foregoing objects in which the self-contained heat source is non-explosive, burns at a definite rate, has a large heat of reaction per unit of volume and unit of weight, is readily ignitible, even at sub-zero temperatures, and produces ash that is effectively electrically non-conducting.

The invention will be described with reference to the accompanying drawings in which FIG. 1 is an exploded perspective view of one embodiment of the elements of a multi-cell thermal battery in accordance with the invention;

FIG. 2, a perspective view of the battery assembled from the elements of FIG. 1;

FIG. 3, a view similar to FIG. 1 showing the elements of the cells of FIG. 1; and FIG. 4, a view similar to FIG. 2 showing the cell assembled from the elements of FIG. 3.

In this specification, and in the claims, the electrode from which current flows into the external circuit will be referred to as the positive electrode. Of course, the other electrode is thus the negative electrode.

The thermal cells provided by this invention comprise, in wholly enclosed combination, at least one pair of metallic electrodes of which one acts as a positive electrode and the other as a negative electrode, a normally solid electrolyte disposed between the electrodes in contact therewith, and a combustible charge contained in the cell for supplying heat when the cell is called upon to function. In accordance with the invention the electrolyte is one, usually an inorganic salt or mixture of inorganic salts, that is normally solid and electrically non-conductive in the cell at storage temperatures but which becomes active as an electrolyte, relative to the electrodes, when heated, usually to render it molten, and continues so to function while in that state and in contact with both electrodes. Most suitably the electrolyte is mounted on or impregnated into a flexible, porous, inert carrier that is not fused by the cell functioning.

Further in accordance with the invention, the combustible charge is one that reacts exothermically to supply sufficient heat to activate the electrolyte and maintain it in activated condition for the necessary length of time, and which performs that function promptly upon ignition and without producing any substantial amount of gas. Preferably also the heat-supplying charge reacts to produce solid products of combustion that are electrically non-conducting in the cell. The cells provided by the invention include also means for igniting the combustible composition to render the cell functionally active, at the desired time, to produce electric current or electric potential whether or not current is also drawn.

A variety of metals may be used to provide the electrode pairs in these thermal cells. The choice of such electrode pairs will depend primarily upon such factors as the power or potential required, the temperature attained when the cell is rendered active, and the particular electrolyte used and its reactivity with one or both electrodes, as well as upon the composition, location and amount of depolarizing agent present. As exemplifying this, reference will be made hereinafter to actual data that show the effect of varying the electrode pairs, variations of electrolyte and of cell temperature, and depolarizing agent.

For many purposes, it is now preferred to use calcium as the negative electrode and nickel as the positive electrode because, among other things, this combination is productive of high E.M.F., as has been determined to be true by actual experience. Furthermore, although the potential of magnesium in the electromotive series lies near that of calcium, so that magnesium may be used to generate voltages close to those produced by calcium as the negative electrode, calcium is more desirable in these cells because of its higher melting point. However, various other materials may be used. For instance, if a low E.M.F. is acceptable the negative electrode may be of magnesium. Also, silver, copper or iron positive electrodes may be used for some purposes. Other materials may be used likewise as those familiar with electrochemistry will recognize.

A wide variety of electrolytes applicable in the practice of the invention are, of course, available. The major criteria are that the electrolyte shall be and remain solid and non-conductive until the cell is to function, that it shall become active, or conductive, by the heat liberated upon exothermic combustion of the contained heating charge, and that it shall act as an electrolyte in cooperation with the electrodes to supply the desired current. The electrolyte should be thermally stable, and the melting point should be relatively low, e.g., 150° to 500° C. to provide for fast activation by a small amount of heating material and also longer life for a given heat supply.

Thus, single salts or mixtures of salts having melting points applicable to any given case in question may be used. Commonly it is preferred to use eutectic compositions of two or more salts because thereby desired low melting compositions are supplied. Other important physical properties of the electrolyte are the boiling point, for the salt should not vaporize under the heat supplied, and the heat of fusion and the specific heat. The coefficient of thermal expansion is significant only in that the cell components should not show excessive relative dimensional changes in order to avoid creation of undesirable stresses within the cell.

Chemically, the electrolyte should for most purposes not undergo reactions, other than electrochemical, with the electrodes or electrolyte carrier although where brief action only is necessary that factor becomes unimportant. Likewise, the electrolyte should not ordinarily undergo gas liberating reaction within itself while heated, nor with the combustible charge in case they are in contact. However, in one embodiment of the invention, which may be termed a burning electrolyte cell, the factor of electrode reaction with the electrolyte or heating charge can be unimportant provided no substantial amount of gas is liberated.

A variety of electrolyte carriers applicable in the practice of the invention are, of course, available. The major criteria are that the carrier shall be and remain solid and non-conductive throughout the fabrication, storage, and functional life of the cell, be porous to the ionic migration of the fused electrolyte during the functional life of the cell, and by maintaining a definite thickness be a physical spacer between the electrodes when the electrolyte is molten. Thus metal oxides, glass fiber products, or ceramics of high melting point and insolubility applicable to any given case may be used. Commonly it is preferred to use a flexible tape woven or felted from fibers of a high melting point, insoluble, high dielectric material or from mixtures of two or more kinds of fibers from such high melting point, insoluble, non-conductive materials. However, in larger power cell applications of the primary thermal cell the electrolyte carrier can vary in physical dimensions in such a manner that it functions primarily as an electrode spacer.

For many purposes it is now preferred to use an electrolyte pad consisting of an electrolyte carrier impregnated with electrolyte. Such electrolyte pads are prepared by passing a ribbon of cleaned woven Fiberglas tape through a melt of the preferred electrolyte at a controlled temperature and a controlled rate thereby controlling the weight of the electrolyte impregnated in the carrier. The impregnated tape is then cooled in such a manner that all components are solid. Electrolyte pads of preferred shape, composition and weight are then cut from the tape. Such electrolyte pads consist of two distinct components, one being the carrier portion that remains continuously solid throughout the fabrication, storage and functional life of the thermal cell, and the other being the electrolyte portion that is liquid during impregnation of the carrier, is solid during storage life of the thermal cell and is liquid during the functional life of the thermal cell.

With most combinations of electrodes and electrolytes a depolarizer should be present. This may be accomplished by the use of a variety of readily reducible oxidizing but thermally stable agents that may be incorporated in the electrolyte itself, or if the depolarizer tends to exert an undesirable action at the electron source it may be applied directly to the surface of the electron sink, or negative electrode. Again, it is possible to supply a depolarizer by chemical reaction within the cell, as will appear hereinafter. Among the depolarizers that we have found to function in the electrolyte, potassium dichromate ($K_2Cr_2O_7$) and potassium chromate ($K_2CrO_4$), molybdic oxide ($MoO_3$), and tungstic oxide ($WO_3$) have been found to be satisfactory with various electrode pairs. The depolarizer may be in solution or in suspension in the electrolyte, or applied to one or both electrodes. One mode of pasting depolarizer is to paint the electron sink with a water slurry of tungstic oxide and lead chromate ($PbCrO_4$); the lead chromate melts at a relatively low temperature and acts as a cement to hold the tungstic oxide in place. Thermal cells prepared with negative electrode depolarizer of 4 parts of $WO_3$ and 1 part of $PbCrO_4$ have maintained an E.M.F. greater than 1.4 v. with a current of 500 milliamperes per sq. in. for more than 30 minutes.

In some instances the combustible, or heat liberating, charge may be incorporated with the electrolyte and be of such nature that upon burning (burning electrolyte) it will form a depolarizer as a result of the combustion. Thus, using silver as the positive electrode with magnesium as the negative electrode and a composition of finely divided nickel (Ni) and sulfur (S) as the combustible charge, the nickel sulfide (NiS) produced upon combustion will coat the silver electrode and depolarize it, whereby the initial provision of a depolarizer becomes unnecessary.

Other oxidizing agents, such as barium peroxide ($BaO_2$) silver chloride (AgCl), and lead dioxide ($PbO_2$), as well as various others that will occur to those familiar with electro-chemical phenomena, may be used as depolarizers. However, better results are to be had with $WO_3$, $MoO_3$, $Fe_2O_3$, $PbCrO_4$, $PbSO_4$, $PbF_2$, and for many purposes it is preferred to use mixtures of depolarizers. In general, the open circuit voltage of combinations of depolarizers falls between those of the individual components. However, $WO_3$ in combination with AgCl or $PbF_2$ produces open circuit potential greater than that of either component used alone, and under load the same thing is true of $WO_3$-AgCl. Similarly, the capacity of the cells is greater with certain combinations than that obtained with the individuals; examples of such combinations are $MoO_3$-AgCl, $MoO_3$-$PbCrO_4$, $WO_3$-AgCl, $WO_3$-$MoO_3$ and $WO_3$-$Fe_2O_3$. Many other combinations are possible, e.g. NaSCN-KSCN.

The electrodes, of course, are to be of higher melting point than the operating temperature in the cell, and they should not react adversely with electrolyte. Likewise, the voltage under load must suffice for the use to which the cell is put. Examples will appear hereinafter.

The following examples are illustrative of electrolytes, electrode pairs, and variations in both, that may be used in the practice of the invention, and of how the functioning temperature and the power available may be varied according to need. Of course, the invention is not in any way limited to these examples, which are purely exemplary, as many other permutations are possible and will occur to those skilled in the art, depending upon the requirements of any particular case.

Mg-LiOH (M.P. 450° C.)-Fe developed about 0.85 v. at 35 ma. load.

Mg-LiOH-Cu developed 1.1 to 1.2 v. at 35 ma. load. The addition of barium chromate ($BaCrO_4$) as a depolarizer resulted in the development of a maximum voltage of 1.84.

Mg-KOH-(M.P. 360° C.)-Fe likewise developed a maximum of 1 v. at 35 ma. load.

Various other single inorganic salts might be used such, for example, as lithium acetate ($CH_3COOLi$, M.P. 70° C.), silver nitrate ($AgNO_3$, M.P. 212° C.), mercuric chloride-iodide (HgICl, M.P. 153° C.) mercurous chloride (HgCl, M.P. 302° C.), and sodium hydroxide (NaOH, M.P. 318° C.).

The following examples are illustrative of binary and ternary compositions:

Mg-$CuSO_4$, LiOH-Cu developed 1.7 to 1.8 v. at 40 ma. load.

Mg-LiOH, $LiNO_3$ (50-50 by weight, M.P. 370°-380° C.)-Cu developed 1.6 v. at 15 ma. load.

Mg-LiCl, KCl eutectic (M.P. 364° C.)-Cu developed 1.44 v. on open circuit and a maximum of 1.2 v. at 10 ohms external resistance.

Mg-LiCl, LiOH eutectic (M.P. 290° C.)-Ag developed 1.2 v. on open circuit. Substituting for Ag an electrode of silver coated with silver chloride (AgCl) the voltage on open circuit was 1.91, while under 10 ohms external resistance it varied from 1.75 to 1.64.

Using the LiCl-KCl eutectic (41 mol percent KCl, 59 mol percent LiCl, M.P. 364° C.) the following voltages were developed under a load of 5000 ohms by the following electrode pairs with the electrolyte at a temperature not exceeding 50° C. above its melting point:

|  | Volts |
|---|---|
| Mg-Cu | 1.64 |
| Mg-CuS | 1.60 |
| Mg-Ag | 1.64 |
| Mg-Ni | 1.62 |
| Mg-Fe | 1.52 |
| Mg-Pt | 1.70 |

The following examples are illustrative of the use of depolarizing agents:

Ca-LiCl, KCl eutectic-Ag developed on open circuit 2.7 v., the silver electrode having been first coated with lead chromate and tungstic oxide as described above.

The benefit to be derived from the use of a depolarizer is shown by the following data obtained with an electrolyte of KCl-LiCl eutectic at a temperature of 390° C., with and without added $K_2Cr_2O_7$ (external load 5000 ohms):

| Electrodes | $K_2Cr_2O_7$-(wt. percent) | |
|---|---|---|
|  | 0 | 3 |
| Mg-Pt, v | 1.21 | 2.50 |
| Mg-steel, v | 1.20 | 2.50 |

Three cells in series comprising magnesium and iron electrodes with an electrolyte of, by weight, 37.9 percent of potassium chloride (KCl), 30.6 percent lithium chloride (LiCl) and 31.5 percent potassium dichromate ($K_2Cr_2O_7$) developed 2 v. at 3.5 amps with an external resistance of 0.5 ohm. In such an electrolyte only a small amount of the dichromate is in solution in the melt.

A cell of magnesium and iron electrodes with an electrolyte of 8 mol percent of potassium dichromate in LiCl-KCl eutectic gave approximately 2.5 v. on open circuit.

The preferred electrolytes are sensitive to moisture. So, if they pick up enough water during manufacture of the cells, the utility of the cells as reserve batteries is lost. So, in making the cells the electrolyte components should be essentially anhydrous and there should be rigorous exclusion of moisture, as by working in a dry box or an atmosphere controlled to contain not more than 5 or 10 percent of relative humidity, and desirably less.

A wide variety of combustible compositions that undergo exothermic reaction without the liberation of any substantial amount of gas are known and have been described. They are generally applicable to the purposes of the invention depending, of course, upon the thermal requirements of the cell. In general they comprise an oxidizable substance and an oxidizing agent, with or without an inert diluent to modify the rate of reaction. For most purposes, we prefer compositions comprising one or more finely divided metals having high heats of combustion, as the oxidizable substance, and as the oxidizing agent any of a variety of inorganic substances that do not react therewith with liberation of any substantial amount of gas, examples being chlorates, perchlorates and nitrates, particularly of the alkali metals, as well as chromates, iron oxide, manganese dioxide and others. The composition must, of course, be capable of ignition by such means as a percussion primer or the well known electric matches.

Also, it must be capable of liberating heat rapidly. Other criteria are that the composition must be stable under cell storage conditions, have high electrical resistance of the resultant ash, and have certain ignition at very low temperatures.

The particular composition to be used will depend upon the requirements of the cell, such as the rapidity with which it is to function, the duration of its functional life, and the amount of heat necessary to effect those ends, as to fuse the electrolyte. Some of these exothermic compositions liberate larger amounts of heat, or react more rapidly, than others, so that the requirements of any particular cell can be supplied readily from the known compositions.

Likewise, the characteristics of these heat-liberating compositions may in general be modified by adding or altering the content of an inert diluent, such, for example, as diatomaceous earth and similar incombustible and non-reactive materials. Of course, where the cells are subjected to such forces as shock, impact or high acceleration, the composition should be insensitive to such forces. By way of illustration, reference may be made to the following compositions that have been found to be satisfactory for the purposes of the invention.

A mixture of zirconium metal (Zr) powder (—200 mesh) and powdered red iron oxide ($Fe_2O_3$) in stoichiometric proportions (43.5% Zr, 51.5% $Fe_2O_3$) with 5 percent by weight of diatomaceous earth as a diluent has been found to be highly satisfactory. It exhibits fast propagation of combustion with good heat capacity.

Another composition that has given satisfactory results is composed of, by weight, 22 percent nickel (Ni) powder, 5 percent zirconium (Zr) powder, 16.8 percent potassium perchlorate ($KClO_4$) and 56.2 percent barium chromate ($BaCrO_4$). This composition ignites easily at low temperatures. It produces about 670 gram calories of heat per cubic centimeter after being compressed at 6000 p.s.i. The relative percentages of the four components may be varied over a wide range to give various burning rates and various heats of combustion per unit volume. The composition just stated after being compressed at 12,000 p.s.i. burns at the rate of 0.1 per second, or a burning time of 10 seconds per inch. As exemplifying how the burning characteristics may be varied, if the percentage of zirconium be held constant and the nickel and potassium perchlorate be maintained in substantially stoichiometric ratio, with the barium chromate being varied as a diluent, a burning time of 3 seconds per inch is to be had with 25 percent of potassium perchlorate and 35.5 percent each of nickel powder and barium chromate. On the other hand, at approximately 12 percent of potassium perchlorate, 15 percent of nickel powder and 67 percent of barium chromate the burning time is increased to 18 seconds per inch.

When nickel is used in these compositions it is preferred that it be prepared by distillation of mercury (Hg) from a nickel-mercury amalgam as described and claimed in U.S. Pat. No. 1,893,879, issued Jan. 10, 1933, on an application filed by Joseph C. W. Frazer and one of the present applicants. Such nickel powder may be stabilized, if desired, as described and claimed in Pat. No. 2,487,632, issued Nov. 8, 1949, likewise issued on an application filed by one of the present applicants. This form of nickel powder is preferred because it has been found to be much more active in these combustible compositions than nickel produced in any other way.

Another composition is one consisting of 9.6 percent, by weight, of granular aluminum (Al) and the balance barium chromate. After being compressed at 10,000 p.s.i. it liberates 423 gram calories per gram.

Desirably, these heat liberating compositions form products of combustion that are electrically insulating, at least under the conditions encountered in the cell. Such a composition may be made from nickel powder, potassium perchlorate and diatomaceous earth. Two such compositions are as follows:

| | Percent by weight | |
|---|---|---|
| Ni powder | 39.2 | 31.45 |
| $KClO_4$ | 23.3 | 18.55 |
| Diatomaceous earth | 37.5 | 50.00 |

Compositions of this type when burned leave a hard, porous and solid residue that exhibits a resistance of as much as one million ohms. In the case of batteries composed of cells in series, as described hereinafter, especially good results are to be had with compositions of zirconium powder and barium chromate, the ash of which is highly non-conductive and thus prevents short circuiting of the cells. Other compositions may be used to accomplish the same result. Thus, Al may replace Zr. The proportions of all such compositions may be varied to provide desired, predetermined burning rate.

Although in general these heating compositions are disposed about the electrodes in various ways that will be exemplified with reference to the drawings, it is equally possible, as indicated above, to incorporate them in the electrolyte itself to provide what may be termed a burning electrolyte. As an example, such an electrolyte may consist of 10 to 15 parts by weight of lithium hydroxide and 90 to 85 parts by weight of a mixture of 4 parts by weight of nickel powder and one part by weight of potassium perchlorate.

Another composition that gives fast activation consists of 21.1 percent by weight of powdered zirconium and 79.9 percent of barium chromate.

Still another satisfactory composition is one consisting of finely divided nickel and powdered sulfur, with the nickel in slight excess of stoichiometric, say 10 percent. With some electrodes, e.g., Ni or Cu, the ash acts as a depolarizer.

In the event that a desirable composition is not readily ignited by chosen means there may, of course, be used a primer composition that is readily ignitible and suffices to initiate reaction of the main heating charge. One such composition comprises 1.2 parts by weight of a mixture of 4 parts of nickel powder and one part of potassium perchlorate, and 2 parts by weight of diatomaceous earth.

Inasmuch as the cells in accordance with the invention are totally and hermetically enclosed, means must be supplied for ignition of the heating charge without destroying the sealing of the cell. For many purposes percussion primers suffice although other means, such as the well known electric matches, may be used with equally satisfactory results.

For the purposes for which these thermal cells are most adapted it is important that they function rapidly when needed, and of course for the necessary length of time. The limiting factor on delay in function is the rate of heat transfer to the electrolyte, while the limiting factors on functional life are either the heat loss from the cell or exhaustion of one or more components of the electrochemical couple. The factor of delay may be minimized in various ways, as by having the charge of heating composition in contact with one or both electrodes, either apart from or mixed with the electrolyte. The life factor may, of course, be provided for in various ways, as by supplying heat insulation to the cell, by providing sufficient heating composition of appropriate burning time to maintain the electrolyte molten over the necessary time interval, and by providing an adequate electrochemical couple.

Although the invention is applicable to single cells comprising but one pair of electrodes, an appropriate electrolyte, preferably on a carrier, a depolarizer, and an associated heating charge, greater capacity and potential may be had by batteries formed of a plurality of such cells connected in series or in parallel, or with some in series and others in parallel, depending upon the requirements of the battery.

Such a battery is shown in FIGS. 1 and 2. Referring to FIG. 1, the battery shown includes three cells 1, 1a and 1b, each constituted of a pair of electrode and an electrolyte pad and constructed as described hereinafter. Heat charges 2 are disposed between the three cells and similar charges 2a and 2b on the outer sides, respectively, of cells 1 and 1b, as shown. These charges may be of any suitable composition as described above, to provide the heat necessary to melt the electrolyte in the cells and to keep it fused for the requisite length of time. The charge is desirably carried by an incombustible base, e.g., thin asbestos paper.

The cells and heat charges are mounted within a battery case 3 in the form of a cup, suitably of light gauge sheet iron or steel. To insulate the cells from the casing wall there is provided ring 4 of heat resistant insulating material, e.g., fiber glass cloth, that fits snugly within the body, or wall of the casing. Discs 5 of heat resistant insulation are disposed between heat charge 2b and the bottom of the casing. Similarly, insulating discs 5a are disposed between heat charge 2a and a battery cap member 6. These elements are packed in the casing in the order shown, preferably under pressure, and the open edge of the casing is crimped over the cap 6 to seal the battery hermetically.

Each cell is provided with a pair of leads 7 and 8. Similar leads, e.g., 7, may be connected in parallel and grounded to the case, while the other leads are connected in parallel and brought out from the cell through a ceramic or other insulating bushing 9, FIG. 2, which shows the assembled battery. Other modes of connecting the leads are, of course, permissible.

The casing is provided also with means for firing the heat charges. In the embodiment shown this takes the form of a percussion primer 10 mounted in the casing wall by a primer holder 10a which hermetically seals the primer in such a manner that upon activation of the primer the primer flame ignites the heat charges 2, 2a and 2b, either directly or by means of a fuse train from the primer to the heat charges.

Considering now the construction of the cells themselves, FIG. 3 shows a circular casing member 11, e.g., of very light gauge (.005" thick) sheet nickel having a short upstanding side wall 11a and having a slot 11b and a terminal tab 11c at diametrically opposed points for passing the electrode leads. Mounted within case 11, in order, are a circular disc 12 of depolarizer, a circular disc electrolyte pad 13 of electrolyte carrier material and electrolyte, as described above, one circular electrode 14, e.g., of Ca, another electrolyte pad 13a, another depolarizer disc 12a and the other circular electrode 15, e.g., of nickel which serves as the cell cover. Lead 7 from electrode 14 passes through the slot 11b while lead 8 from the electrode 15 is fastened to tab 11c of the case, thereby connecting case 11 and electrode 15 as one electrode. The assembly is compressed under pressure and wall 11a crimped over, as seen in FIG. 4, to seat it. Various modifications are, of course, permissible, e.g., the case may be otherwise shaped, e.g., square or rectangular, the edges may be sealed by rolling or seam welding instead of crimping, and the terminal leads may be brought out at any desired angle.

In all of the cells of our invention the electrolyte is normally solid but it becomes active upon ignition of the heat liberating charge, which reacts with liberation of heat but with production of substantially no gaseous products of combustion. As soon as the electrolyte is sufficiently heated, usually to melt it, an electric current is generated, the capacity of which depends upon the particular electrodes and electrolyte, the temperature of the fused electrolyte, the presence or absence of an oxidizing, or depolarizing, agent, and related factors.

In the use of a cell, of the type of FIG. 1 with three cells having electrodes of nickel and calcium, an electrolyte of, by weight, 50 percent lithium chloride and 50 percent potassium chloride, an electrolyte carrier of Fiberglas tape, and a depolarizer of potassium dichromate, and heated by a composition of 21% zirconium metal powder and 79 percent of barium chromate, the cell will deliver a maximum of 2.5 volts at 25 amperes in about one half of one second after firing, and after 10 seconds it will deliver a minimum of 2 volts at 25 amperes. The opening characteristics of the cell of the type of FIG. 1 are therefore as follows: potential 2.5 volts max.; 2.0 volts minimum per cell; current density approximately 6 amperes per square inch of electrode area; current 25 amperes; life approximately 10 seconds; capacity 250 ampere seconds; weight 0.16 pound; volume 1.5 cubic inches; and activation time 0.5 second.

The electrolytes should be made from anhydrous salts, and in the case of compounds that are deliquescent the atmosphere in which they are handled should be dry to the point where they do not pick up moisture.

Although hydroxides and other compounds utilizable for the purposes of the invention are not salts in the narrow sense of the word, the term "salt" as used herein contemplates all inorganic compounds that supply electrolytes as defined herein.

According to the provisions of the patent statutes, we have explained the principle and mode of practicing our invention and have illustrated and described what we now consider to represent its best embodiment. However, we desire to have it understood that, within the scope of the appended claims, the invention may be practiced otherwise than as specifically described.

We claim:

1. A thermal, or deferred action, cell comprising spaced calcium and nickel electrodes, an inorganic salt disposed between said electrodes, said salt being solid and electrically non-conducting in the cell at normal storage temperatures but becoming an electrolyte in the molten state, and means contained in the cell for supplying heat to melt said electrolyte.

2. A cell according to claim 1, said electrolyte comprising the eutectic mixture of LiCl and KCl.

3. A self-contained primary battery comprising at least two pairs of cells according to claim 1, spaced by and in contact with a combustible charge for supplying heat to activate said cells, said charge being combustible exothermically with production of an electrically non-conducting combustion product and means for igniting said composition to render the cell functionally active to produce electric current.

4. A self-contained thermal cell comprising spaced metallic electrodes, at least one inorganic salt disposed between said electrodes in contact therewith, said salt being solid and electrically non-conducting in the cell at normal temperatures but becoming an active electrolyte when heated, said salt being carried on a porous, inert, electrically non-conducting carrier that is infusible during operation of the cell, a combustible charge contained in the cell for supplying heat to said salt and comprising an ignitible composition combustible exothermically to heat said salt substantially immediately after ignition without production of any substantial amount of gas, and means for igniting said composition to render the cell functionally active to produce electric current.

5. A self-contained thermal cell comprising spaced metallic electrodes, in contact therewith a porous pad of high melting inorganic and inert material impregnated with at least one inorganic salt that is solid and electrically non-conducting in the cell at normal temperatures but which becomes an electrolyte in the molten state, a combustible charge contained in the cell for supplying heat to melt said salt and comprising an ignitible composition of at least one finely divided oxidizable metal and an oxidizing agent, said charge being combustible exothermically to melt said salt substantially immediately after ignition without production of any substantiial amount of gas and with formation of solid combustion product that is electrically non-conducting in the cell, and means for igniting said composition to render the cell functionally active to produce electric current.

References Cited

UNITED STATES PATENTS

| | | | |
|---|---|---|---|
| 856,162 | 6/1907 | Kitsee | 136—153.2 |
| 939,183 | 11/1909 | Blackmore | 136—153X |
| 2,081,926 | 6/1937 | Gyuris | 136—153.1X |
| 2,291,739 | 8/1942 | McGrath | 136—153 |
| 2,612,532 | 9/1952 | Heise et al. | 136—86 |

FOREIGN PATENTS 123,720   2/1947   Australia _____ 136—114

OTHER REFERENCES

General Chemistry: Horace G. Demine, 4th ed., John Wiley & Sons, Inc., 1935 p. 657.

ALLEN B. CURTIS, Primary Examiner

U.S. Cl. X.R.

136—90